March 22, 1955     C. WOESSNER     2,704,560
TILT ARBOR BENCH SAW

Filed Feb. 12, 1953     2 Sheets-Sheet 1

INVENTOR.
CARL WOESSNER
BY
Percy Freeman
ATTORNEY.

March 22, 1955        C. WOESSNER        2,704,560
TILT ARBOR BENCH SAW
Filed Feb. 12, 1953        2 Sheets-Sheet 2
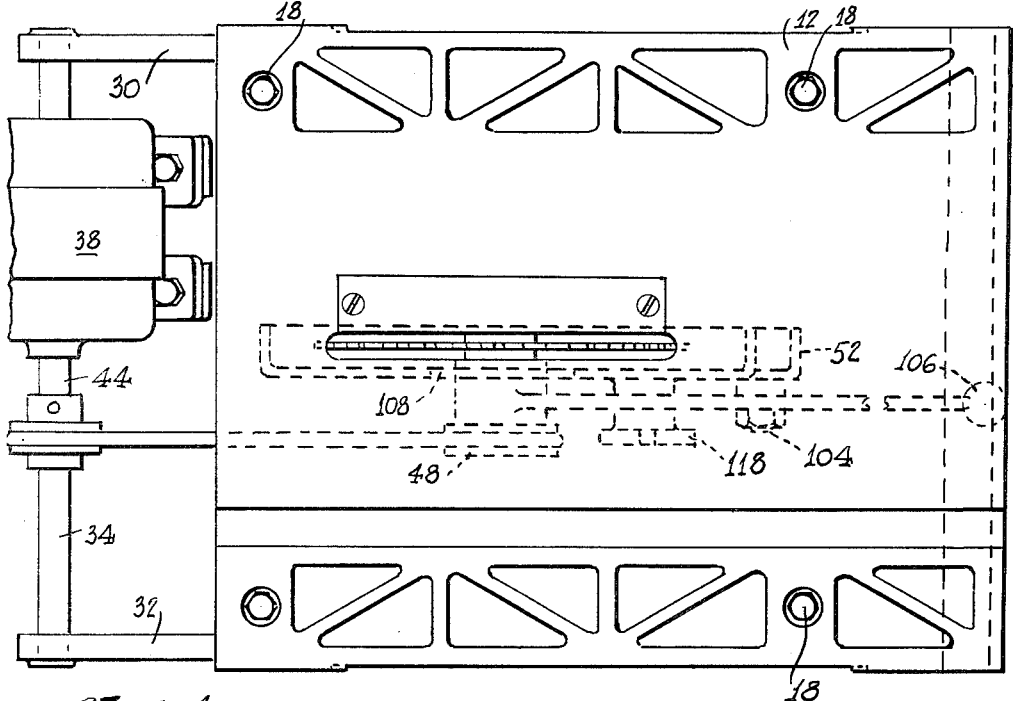
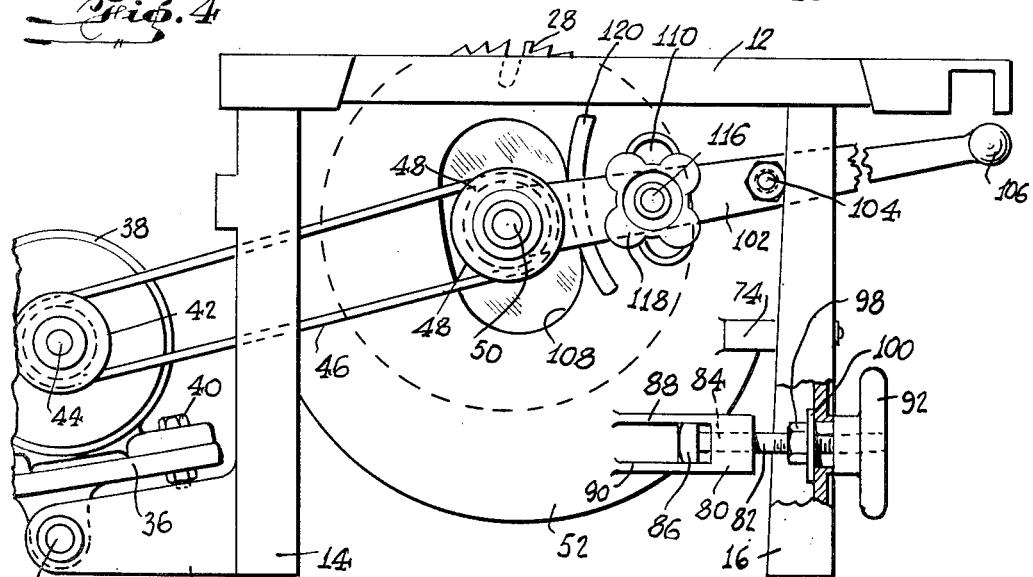
INVENTOR.
CARL WOESSNER.
BY
ATTORNEY.

United States Patent Office 2,704,560
Patented Mar. 22, 1955

2,704,560

TILT ARBOR BENCH SAW

Carl Woessner, Bloomfield, N. J., assignor to Gibraltar Manufacturing Co., Inc., Jersey City, N. J., a corporation of New Jersey Application February 12, 1953, Serial No. 336,599

1 Claim. (Cl. 143—36)

This invention relates to a tilting arbor table saw.

Tilting arbor saws are circular motor-driven saws mounted on a cradle that is suspended below the table top of a saw table. The cradle is mounted for angular movement about a horizontal axis. Adjacent said axis or coinciding therewith is an opening in the table top through which the circular saw may project. It is extremely desirable that the saw intersect the surface plane of the table top along substantially the same line of intersection irrespective of the angular position of the cradle which supports the saw.

It is the principal object of this invention to provide a tilting arbor table saw in which the surface plane of the table is intersected along precisely the same line irrespective of the angular position of the saw cradle. This is true when the saw is supported at an angle of ninety degrees with respect to the table top, it is true when the saw is supported at an angle of forty-five degrees with respect to the table top, and it is equally true when the saw is supported at any other angle intermediate these two angles relative to the table top. This makes for extremely precise wood cutting at any angle and it renders it possible to provide a relatively narrow slit in the table top for the saw. The narrower the slit, the greater will be the support which the table top will provide for the work.

This object is attained by providing the cradle with trunnion supports mounted for movement in either direction along or through arcuate tracks or channels. These arcuate tracks or channels are equidistant at all points from a horizontal line which lies on the horizontal plane of the working surface of the table top. This horizontal line extends through the slit in the table top, longitudinally thereof, through which the saw projects. The saw is so positioned on the cradle that it always coincides with said horizontal line whatever the angular position of the cradle may be.

Another important object of this invention is the provision of a tilting arbor table saw of the character described, wherein a simple, inexpensive but structurally strong trunnion support is provided. It is an important feature of this invention that tilting arbor saws made in accordance therewith may be produced at an exceedingly low cost in order to sell at a price that would be low enough to be within reach of the general consuming public. The trunnions which are herein provided are simply pins which are fixed to the cradle and which are movably mounted in arcuate tracks or channels formed in the table structure. These pins may also be used as stop members to limit the angular movement of the saw cradle in either direction. For example, these pins may be situated relative to pins fixed in the table structure so as to prevent movement of the cradle in one direction beyond the point where the saw is perpendicular to the table top and to prevent movement of the cradle in the opposite direction beyond the point where the saw bears at an angle of forty-five degrees to the table top.

A preferred form of this invention is shown in the accompanying drawing in which:

Fig. 3 is a view of another side of said tilting arbor saw, showing its motor drive, the elevating and lowering means, and the clamping means whereby the saw cradle may be clamped and locked in any selected angular position.

Fig. 4 is a top view of said tilting arbor saw.

Figure 2:
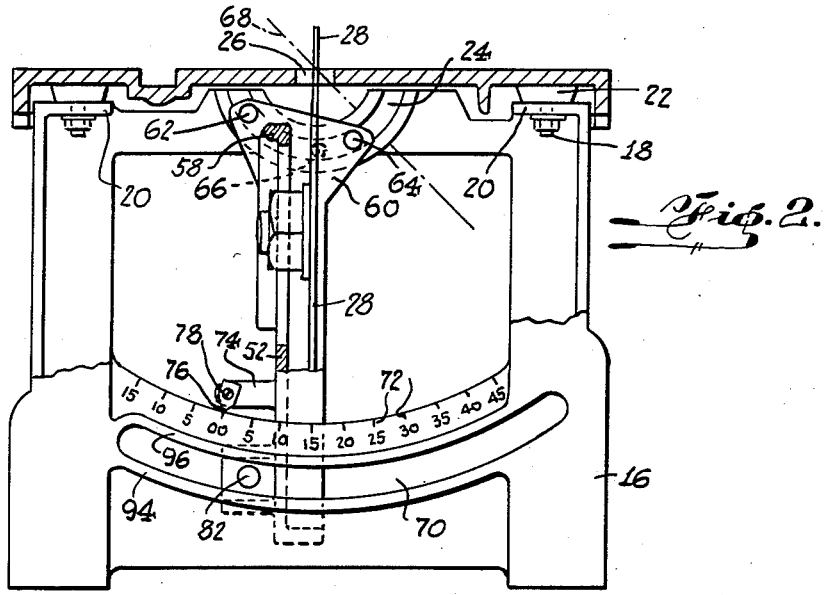
Fig. 2 is a side view of said tilting arbor saw with its table structure partly broken way and in section to reveal the cradle construction and its trunnioned engagement with the arcuate tracks.

The tilting arbor saw which is herein claimed is provided with a table top 12 and a pair of side frame members 14 and 16 respectively which support the table top and also the saw mechanism hereinafter described. The two side frame members occupy substantially parallel spaced vertical planes and the table top occupies a horizontal plane. Bolts 18 are provided to secure the side frame members and the table top together. In this connection it will be noted that the heads of said bolts are sunk into recesses in the table top so as not to project above the top or working surface plane of the table top. It will be seen that the side frame members are formed with horizontal flanges at their top corners, identified in the drawing by means of the reference character 20, and that the corners of the table top are provided with cooperating bosses 22. It is through these bosses and flanges that bolts 18 project and it is into these bosses that the heads of the bolts are sunk. The bosses rest upon said flanges and the bolts clamp them together, thereby securing the table top to the side frame members as stated.

An arcuate track or channel 24 is formed in each side frame member, on the inner side thereof, facing the other side frame member. The two arcuate tracks or channels 24 are in perfect axial alignment with each other and they are both equidistant at all points from a common horizontal center line which coincides with the top horizontal plane surface of the table. It will be noted that a slit 26 is formed in the table top and it is through said slit that the circular saw blade 28 projects. The horizontal line last mentioned extends substantially through the center of said slit, longitudinally thereof, and it is on said horizontal line that the saw blade is disposed as shown in Fig. 2 of the drawing.

Side frame member 14 is provided with side arms 30 and 32 respectively which support a rod 34. A platform 36 is loosely pivotally and slidably mounted on said rod 34 and an electric motor 38 is mounted on said platform and is adjustably secured thereto by means of bolts 40. The motor drives saw 28 through a pulley 42 on motor shaft 44, a drive belt 46, a pulley 48, and a shaft or arbor 50 to which the saw is secured in conventional manner. It will be understood that the drive belt 46 is always maintained under tension by reason of the fact that the weight of the motor tends to swing the motor with its freely pivoted supporting platform 36 in counter-clockwise direction about the axis of rod 34, as viewed in Fig. 3. This pivotal motor support compensates for variations in the position of the saw arbor, whether resulting from tilting the saw as shown in Fig. 2 or from raising or lowering the saw by the means shown in Fig. 3. This is particularly important since tilting the saw in the manner indicated in Fig. 2 tends to cause a twisting of the drive belt and a consequent shortening of the distance between motor shaft 44 and saw shaft or arbor 50.

Figure 1:
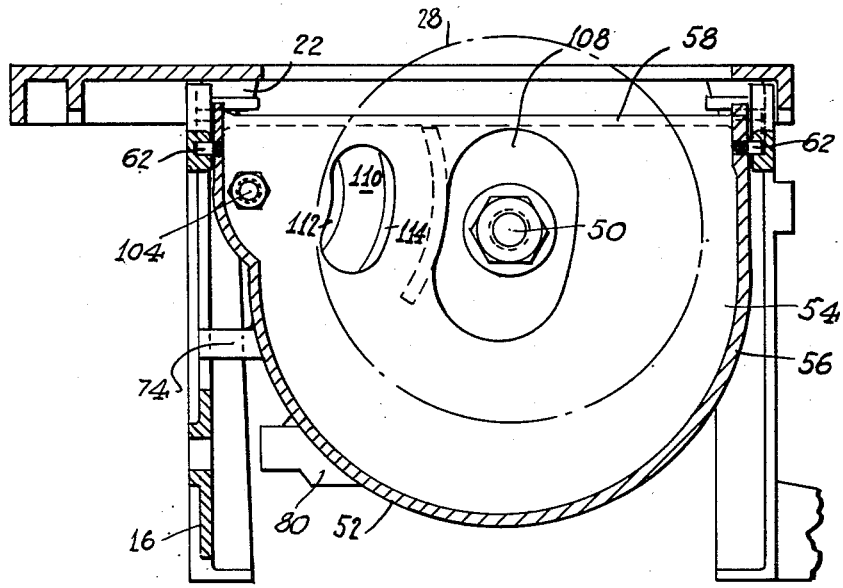
Fig. 1 is a vertical section through a tilting arbor saw made in accordance with this invention, showing how the saw cradle is supported by trunnions in arcuate tracks formed in the table structure which supports said cradle.

Saw cradle 52 is best shown in Figs. 1 and 2. It will there be seen that it comprises a plate 54 having a flange 56 formed along its peripheral edge and assuming the shape, generally, of the letter U in side or sectional view as is clearly shown in Fig. 1. This flange tends to strengthen and reinforce the plate and enclose the saw blade. A relatively heavy bead or flange 58 is formed along the top edge of said plate 54, also for reinforcing and strengthening purposes. It will be noted in Fig. 2 that flange 56 flares sidewardly and outwardly at its two upper ends to form enlarged flange portions 60. See Fig. 2. Fixed in each enlarged flange portion 60 is a pair of laterally extending pins 62 and 64 respectively which project into annular tracks or channels 24 in the two side frame members. These pins serve as trunnions for supporting the cradle in said annular tracks or channels. The trunnions are free to move longitudinally of and through these channels but the upper and lower walls of the channels prevent lateral rocking or chattering of the trunnions during operation of the machine. It may be desired to provide stop pins 66 in tracks or channels 24 and thereby to prevent movement of trunnions 62 and 64 beyond a predetermined point in one direction or in the other direction along said tracks. Pins 66, for example, are positioned to engage pins 62 when the cradle is tilted in counter-clockwise direction, as viewed in Fig. 2, until the saw supported by said cradle reaches a forty-five degree position indicated by interrupted lines 68. Another set of pins may be provided to engage pins 64 when the cradle is turned in clockwise direction until the saw reaches its ninety degree position indicated by the solid lines in Fig. 2 or any selected annular position to the right thereof. The use of these stop pins 66 or any other stop pins or stop members is purely optional.

Trunnions 62 and 64 may be secured to the cradle in any conventional manner, as by means of set screws or cross pins or simply by press fitting said pins into suitable holes preformed for said pins in the cradle. In such case, the pins may be knurled on their inwardly projecting portions so as to provide a tight fit.

Side frame member 16 is provided with an arcuate slot 70 and with calibrations 72 formed adjacent thereto. These calibrations are intended to indicate the angular position of saw cradle 52 and to that end an arm 74 is provided on said cradle and an indicator or pointer 76 is provided on said arm for cooperation with said calibrations 72. Pointer 76 is secured to arm 74 by means of a screw 78 and when the screw is loosened, the angular position of the pointer may be adjusted to accurately indicate the angular position of the cradle with respect to calibrations 72.

Another arm 80 is formed on the cradle 52 and a bolt 82 projects through a hole 84 in said arm 80. The head 86 of the bolt is square and it engages ridges 88 and 90 formed on the cradle immediately behind arm 80 to prevent the bolt from turning about its own longitudinal axis. The threaded end of the bolt projects in the direction of slot 70 and it may project through said slot as Fig. 3 indicates. It is engaged by an internally threaded clamping knob or handle 92 which bears against ridges or flanges 94 and 96 formed along the side edges of arcuate slot 70. A nut 98 is secured to bolt 82 behind slot 70 and a washer 100 is provided between said nut 98 and that portion of the side frame member 16 in which slot 70 is formed. Consequently, when knob or handle 92 is tightened upon bolt 82, side frame member 16 will be clamped between said knob or handle and washer 100 and any movement of bolt 82 through slot 70 will thereby be prevented. Since bolt 82 is secured to arm 80 on cradle 52, this will have the effect of clamping the cradle in any selected arcuate position indicated by calibrations 72.

It will of course be understood that slot 70 is concentric with arcuate tracks or channels 24 and that the center point about which said tracks and said slot are described is the point or line of inetrsection between the saw blade on the one hand and the horizontal surface plane of the table top on the other hand.

It has been stated that the saw blade and its arbor may be elevated or lowered so as to project more or less of the blade through slit 26 in the table top. The means for adjusting the position of the saw and its arbor are shown in Fig. 3. It will there be seen that an arm 102 is pivotally mounted on cradle 52 by means of bolt 104. The outer end of arm 102 is provided with a ball-shaped portion 106 which serves as a handle for pivotally moving said arm 102 about the axis of bolt 104. The inner end of arm 102 rotatably supports saw arbor 50 in conventional manner and this, indeed, is the manner in which the saw arbor and the saw are mounted upon the saw cradle. It will be seen that an elongated opening 108 is formed in web or plate 54 of the cradle. It is through said elongated opening that saw arbor 50 extends as Fig. 3 clearly shows and its elongated shape allows the arbor to move vertically therein to either raise or lower the saw relative to the table top. A second elongated opening 110 is formed in said web or plate 54 of cradle 52 and a pair of flanges 112 and 114 are formed along the side edges of said opening 110. A bolt 116 engages arm 102 through opening 110. An internally threaded knob or handle 118 engages bolt 116 and bears against flanges 112 and 114. When knob or handle 118 is loose upon bolt 116, arm 102 may be pivoted in either clockwise or counter-clockwise direction about the axis of bolt 104 as viewed in Fig. 3 so as to raise or lower the saw arbor and the saw. When the saw is in desired position with respect to the extent to which it projects above the table top, knob or handle 118 may be tightened upon bolt 116 to lock arm 102 in place, thereby locking the saw arbor and the saw at their desired elevation. An arcuate ridge 120 may be provided on web or plate 54 of cradle 52 in concentric relation to bolt 104 and this arcuate ridge may serve as a bearing support for arm 102 when the arm is clamped in selected angular position about bolt 104.

The foregoing illustrates a preferred form of this invention and it will clearly be understood that this preferred form may be modified and other preferred forms may be provided within the broad scope and spirit of the invention and claim.

I claim:

A tilting arbor saw, comprising a table top, a pair of side frame members supporting the table top, an arcuate channel track formed in each said side frame member, said channel tracks being formed on the inner facing sides of said side frame members, in registration with each other, and equidistant at all points from a common horizontal line which is drawn through and on the top surface plane of the table top, a saw slit formed in said table top along said horizontal line, a cradle, a pair of trunnion pins on one side of the cradle projecting into one of said arcuate channel tracks, a second pair of trunnion pins on the opposite side of the cradle and projecting into the other channel track, whereby the cradle is rendered arcuately movable relative to the table top while being supported by said side frame members, the arcuate movement of said cradle being about said horizontal line, an arcuate slot formed in one of said side frame members in concentric relation to the arcuate channel track formed in said side frame member, a screw member secured to said cradle and projecting through said arcuate slot, a screw-threaded clamping handle engaging said screw member and engageable with said side frame member along the edges of said arcuate slot to clamp the cradle in any selected angular position about said horizontal line, calibrations formed along said arcuate slot and a pointer for said calibrations secured to the cradle to indicate the angular position of said cradle relative to the table top, an arm pivotally mounted on said cradle, a handle at the outer end of said arm for pivoting the same either upwardly or downwardly, a clamp between said arm and said cradle for clamping the arm to the cradle in any selected angular position thereon, a motor driven arbor rotatably mounted on the inner end of said arm and a circular saw mounted on said arbor, said saw being positioned to project through the saw slit in the table top along said horizontal line when the arm is pivoted to raise the arbor, irrespective of the angular position of the cradle about said horizontal line.

References Cited in the file of this patent

UNITED STATES PATENTS

| | | |
|---|---|---|
| 210,100 | Connell | Nov. 19, 1878 |
| 580,130 | Herschel | Apr. 6, 1897 |
| 1,679,103 | Thomson | July 31, 1928 |
| 1,922,151 | Boice et al. | Aug. 15, 1933 |
| 1,993,219 | Merrigan | Mar. 5, 1935 |
| 2,057,157 | Matheson | Oct. 13, 1936 |
| 2,163,320 | Hammond | June 20, 1939 |
| 2,168,282 | Tautz | Aug. 1, 1939 |
| 2,530,290 | Collins | Nov. 14, 1950 |